(12) United States Patent
Yasukawa et al.

(10) Patent No.: US 11,082,873 B2
(45) Date of Patent: Aug. 3, 2021

(54) USER EQUIPMENT AND REPORTING METHOD

(71) Applicant: NTT DOCOMO, INC., Tokyo (JP)

(72) Inventors: Shimpei Yasukawa, Tokyo (JP); Kazuaki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 356 days.

(21) Appl. No.: 16/088,721

(22) PCT Filed: Mar. 16, 2017

(86) PCT No.: PCT/JP2017/010602
§ 371 (c)(1),
(2) Date: Sep. 26, 2018

(87) PCT Pub. No.: WO2017/169829
PCT Pub. Date: Oct. 5, 2017

(65) Prior Publication Data
US 2020/0169902 A1 May 28, 2020

(30) Foreign Application Priority Data

Mar. 31, 2016 (JP) .............................. JP2016-073462

(51) Int. Cl.
*H04B 17/24* (2015.01)
*H04B 17/373* (2015.01)
(Continued)

(52) U.S. Cl.
CPC ............ *H04W 24/10* (2013.01); *H04B 17/24* (2015.01); *H04B 17/373* (2015.01);
(Continued)

(58) Field of Classification Search
CPC ......... H04B 17/0082–382; H04L 5/003–0098; H04L 1/0001–0693; H04L 1/20–208;
(Continued)

(56) References Cited

U.S. PATENT DOCUMENTS

2010/0103833 A1* 4/2010 Englund ............... H04L 1/0026
2010/0278058 A1* 11/2010 Damnjanovic ....... H04L 1/0029
(Continued)

FOREIGN PATENT DOCUMENTS

EP          2557839 A1    2/2013
JP       2004-186969 A    7/2004
(Continued)

OTHER PUBLICATIONS

Partial Supplementary European Search Report issued in European Application No. 17774373.9, dated Aug. 13, 2019 (13 pages).
(Continued)

*Primary Examiner* — Timothy J Weidner
(74) *Attorney, Agent, or Firm* — Osha Bergman Watanabe & Burton LLP

(57) ABSTRACT

Provided is a user equipment in a radio communication system including a base station and the user equipment. The user equipment includes: a reception unit that receives an instruction related to a calculation method of a channel quality indicator, which is to be reported to the base station, from the base station; and a reporting unit that reports an index of a channel quality indicator, which is calculated in accordance with the instruction related to the calculation method of the channel quality indicator, to the base station.

8 Claims, 10 Drawing Sheets

(a)
CQI TABLE(for BLER x%) : ENCODING METHOD X

| CQI index | modulation | code rate x 1024 | efficiency |
|---|---|---|---|
| 0 | out of range | | |
| 1 | QPSK | 40 | 0.0781 |
| 2 | QPSK | 78 | 0.1523 |
| 3 | QPSK | 120 | 0.2344 |
| 4 | QPSK | 193 | 0.3770 |
| 5 | QPSK | 308 | 0.6016 |
| 6 | QPSK | 449 | 0.8770 |
| 7 | QPSK | 602 | 1.1758 |
| 8 | 16QAM | 378 | 1.4766 |
| 9 | 16QAM | 490 | 1.9141 |
| 10 | 16QAM | 616 | 2.4063 |
| 11 | 64QAM | 466 | 2.7305 |
| 12 | 64QAM | 567 | 3.3223 |
| 13 | 64QAM | 666 | 3.9023 |
| 14 | 64QAM | 772 | 4.5234 |
| 15 | 64QAM | 873 | 5.1152 |

| 14 | 64QAM | 772 | 4.5234 |
| 15 | 64QAM | 873 | 5.1152 |

CQI TABLE(for BLER x%) : ENCODING METHOD Y (b)
CQI TABLE(for BLER 10%) : ENCODING METHOD X

| CQI index | modulation | code rate x 1024 | efficiency |
|---|---|---|---|
| 0 | out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

| 14 | 64QAM | 873 | 5.1152 |
| 15 | 64QAM | 948 | 5.5547 |

CQI TABLE(for BLER 10%) : ENCODING METHOD Y

(51) Int. Cl.
*H04L 1/00* (2006.01)
*H04L 5/00* (2006.01)
*H04W 24/10* (2009.01)
*H04W 28/02* (2009.01)
*H04W 84/02* (2009.01)
*H04W 88/06* (2009.01)
*H04W 88/10* (2009.01)
*H04W 92/10* (2009.01)
*H04L 1/20* (2006.01)

(52) U.S. Cl.
CPC .............. *H04L 1/0026* (2013.01); *H04L 1/20* (2013.01); *H04L 5/006* (2013.01); *H04L 5/0057* (2013.01); *H04L 5/0087* (2013.01); *H04W 28/0205* (2013.01); *H04W 28/0236* (2013.01); *H04W 28/0252* (2013.01); *H04W 28/0268* (2013.01); *H04W 84/02* (2013.01); *H04W 88/06* (2013.01); *H04W 88/10* (2013.01); *H04W 92/10* (2013.01)

(58) Field of Classification Search
CPC ............. H04W 4/70; H04W 8/22–245; H04W 24/02–10; H04W 28/02–26; H04W 48/02–16; H04W 72/005–14; H04W 84/02; H04W 84/04–047; H04W 88/02; H04W 88/04–10; H04W 92/04; H04W 92/10

See application file for complete search history.

(56) References Cited

U.S. PATENT DOCUMENTS

| | | |
|---|---|---|
| 2013/0258877 A1 | 10/2013 | Ji et al. |
| 2015/0146696 A1* | 5/2015 | Golitschek Edler Von Elbwart ................ H04L 1/0026 |
| 2017/0223697 A1 | 8/2017 | Golitschek Edler von Elbwart et al. |

FOREIGN PATENT DOCUMENTS

| | | |
|---|---|---|
| JP | 2014522194 A | 8/2014 |
| JP | 2015-511475 A | 4/2015 |

OTHER PUBLICATIONS

3GPP TS 36.213 V13.0.1; "3rd Generation Partnership Project; Technical Specification Group Radio Access Network; Evolved Universal Terrestrial Radio Access (E-UTRA); Physical layer procedures (Release 13)"; Jan. 2016 (326 Pages).

International Search Report issued in PCT/JP2017/010602 dated May 23, 2017 (9 Pages).

Written Opinion of International Searching Authority issued in PCT/JP2017/010602 dated May 23, 2017 (17 Pages).

Office Action issued in Japanese Application No. 2018-509010; dated Apr. 13, 2021 (7 pages).

* cited by examiner

| CQI index | modulation | code rate x 1024 | efficiency |
|---|---|---|---|
| 0 | out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

(b)

| CQI index | modulation | code rate x 1024 | efficiency |
|---|---|---|---|
| 0 | out of range | | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 256QAM | 711 | 5.5547 |
| 13 | 256QAM | 797 | 6.2266 |
| 14 | 256QAM | 885 | 6.9141 |
| 15 | 256QAM | 948 | 7.4063 |

(c)

| CQI index | modulation | code rate x 1024 x | efficiency |
|---|---|---|---|
| 0 | out of range | | |
| 1 | QPSK | 40 | 0.0781 |
| 2 | QPSK | 78 | 0.1523 |
| 3 | QPSK | 120 | 0.2344 |
| 4 | QPSK | 193 | 0.3770 |
| 5 | QPSK | 308 | 0.6016 |
| 6 | QPSK | 449 | 0.8770 |
| 7 | QPSK | 602 | 1.1758 |
| 8 | 16QAM | 378 | 1.4766 |
| 9 | 16QAM | 490 | 1.9141 |
| 10 | 16QAM | 616 | 2.4063 |
| 11 | Reserved | Reserved | Reserved |
| 12 | Reserved | Reserved | Reserved |
| 13 | Reserved | Reserved | Reserved |
| 14 | Reserved | Reserved | Reserved |
| 15 | Reserved | Reserved | Reserved |

FIG.6

(a) CQI TABLE (for BLER x%)

| CQI index | modulation | code rate x 1024 | efficiency |
|---|---|---|---|
| 0 | | out of range | |
| 1 | QPSK | 40 | 0.0781 |
| 2 | QPSK | 78 | 0.1523 |
| 3 | QPSK | 120 | 0.2344 |
| 4 | QPSK | 193 | 0.3770 |
| 5 | QPSK | 308 | 0.6016 |
| 6 | QPSK | 449 | 0.8770 |
| 7 | QPSK | 602 | 1.1758 |
| 8 | 16QAM | 378 | 1.4766 |
| 9 | 16QAM | 490 | 1.9141 |
| 10 | 16QAM | 616 | 2.4063 |
| 11 | 64QAM | 466 | 2.7305 |
| 12 | 64QAM | 567 | 3.3223 |
| 13 | 64QAM | 666 | 3.9023 |
| 14 | 64QAM | 772 | 4.5234 |
| 15 | 64QAM | 873 | 5.1152 |

(b) CQI TABLE (for BLER 10%)

| CQI index | modulation | code rate x 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

(c)

| CQI index | modulation | code rate x 1024 | efficiency |
|---|---|---|---|
| 0 | | out of range | |
| 1 | QPSK | 40 | 0.0781 |
| 2 | QPSK | 78 | 0.1523 |
| 3 | QPSK | 120 | 0.2344 |
| 4 | QPSK | 193 | 0.3770 |
| 5 | QPSK | 308 | 0.6016 |
| 6 | QPSK | 449 | 0.8770 |
| 7 | QPSK | 602 | 1.1758 |
| 8 | 16QAM | 378 | 1.4766 |
| 9 | 16QAM | 490 | 1.9141 |
| 10 | 16QAM | 616 | 2.4063 |
| 11 | 64QAM | 466 | 2.7305 |
| 12 | 64QAM | 567 | 3.3223 |
| 13 | 64QAM | 666 | 3.9023 |
| 14 | 64QAM | 772 | 4.5234 |
| 15 | 64QAM | 873 | 5.1152 |

CQI indices 1–6: CQI TABLE (for BLER x%)
CQI indices 7–15: CQI TABLE (for BLER 10%)

| CSI report | Coding index | CQI index | .... |

CQI TABLE(for BLER x%) : ENCODING METHOD X

| CQI index | modulation | code rate x 1024 | efficiency |
|---|---|---|---|
| 0 | | out of range | |
| 1 | QPSK | 40 | 0.0781 |
| 2 | QPSK | 78 | 0.1523 |
| 3 | QPSK | 120 | 0.2344 |
| 4 | QPSK | 193 | 0.3770 |
| 5 | QPSK | 308 | 0.6016 |
| 6 | QPSK | 449 | 0.8770 |
| 7 | QPSK | 602 | 1.1758 |
| 8 | 16QAM | 378 | 1.4766 |
| 9 | 16QAM | 490 | 1.9141 |
| 10 | 16QAM | 616 | 2.4063 |
| 11 | 64QAM | 466 | 2.7305 |
| 12 | 64QAM | 567 | 3.3223 |
| 13 | 64QAM | 666 | 3.9023 |
| 14 | 64QAM | 772 | 4.5234 |
| 15 | 64QAM | 873 | 5.1152 |

CQI TABLE(for BLER x%) : ENCODING METHOD Y

(b)

CQI TABLE(for BLER 10%) : ENCODING METHOD X

| CQI index | modulation | code rate x 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

CQI TABLE(for BLER 10%) : ENCODING METHOD Y

USER EQUIPMENT AND REPORTING METHOD

TECHNICAL FIELD

The present invention relates to a user equipment and a reporting method.

BACKGROUND ART

In long term evolution (LTE), it is defined that a user equipment UE measures a downlink radio channel state, and reports channel state information (CSI) to a base station eNB on the basis of the measurement result. In addition, the base station eNB performs scheduling of a downlink shared channel on the basis of the channel state information that is reported from the user equipment.

The channel state information includes a rank indicator (RI), a precoding matrix indicator (PMI), and a channel quality indicator (CQI). The rank indicator and the precoding matrix respectively represent the number of transmission layers and a precoding matrix which are preferably used in a downlink shared channel (DL-SCH). The channel quality indicator represents the most efficient combination of a modulation mode and a code rate among combinations of modulation modes and code rates in which a block error rate (BLER) of a transport block (TB) in the downlink shared channel becomes 10% or less (for example, refer to Non-Patent Document 1).

CITATION LIST

Non-Patent Document

Non-Patent Document 1: 3GPP TS 36.213 V13.0.1 (2016-01)

SUMMARY OF THE INVENTION

Problem to be Solved by the Invention

Currently, an examination of a radio technology of a fifth generation (5G) is in progress so as to realize a further increase in system capacity, a further increase in a data transmission speed, a further improvement of reliability in a radio section, low latency, and the like.

In addition, in the 5G, an examination of a communication technology called ultra-reliable and low-latency communications is in progress so as to realize the further improvement of the reliability and the low latency. In the URLLC, for example, a packet reception success rate of 99.999% or greater is exemplified as a required condition.

So as to realize the packet reception success rate of 99.999% or greater, it is considered that the upper limit of a block error rate defined in current LTE is necessary to be set to a stricter value. In the current LTE, the user equipment selects a channel quality indicator in which the block error rate of TB is estimated to be 10% or less, and reports the channel quality indicator to the base station. On the other hand, so as to realize the URLLC, it is considered that the upper limit of the block error rate is preferably set to a value (for example, 1% and the like) that is further lower than current 10%.

However, in the current LTE, it is fixedly defined that the channel quality indicator in which the block error rate is assumed as 10% or less is reported from the user equipment to the base station. That is, in the current LTE, it is difficult to report the channel quality indicator, which realizes a block error rate that is further lower than 10%, from the user equipment to the base station.

A disclosed technology has been made in consideration of the above-described circumstances, and an object thereof is to provide a technology capable of reporting a channel quality indicator that realizes a relatively low block error rate to a base station.

Means for Solving Problem

According to an aspect of the disclosed technology, there is provided a radio communication system including: a reception unit that receives an instruction related to a calculation method of a channel quality indicator, which is to be reported to the base station, from the base station; and a reporting unit that reports an index of a channel quality indicator, which is calculated in accordance with the instruction related to the calculation method of the channel quality indicator, to the base station

Effect of the Invention

According to the aspect of the disclosed technology, it is possible to provide a technology capable of reporting a channel quality indicator that realizes a relatively low block error rate to the base station.

BRIEF DESCRIPTION OF DRAWINGS

FIG. 1 is a view illustrating a CQI table that is defined in LTE;

FIG. 6 is a view illustrating an example of a CQI table according to this embodiment;

FIG. 9 is a view illustrating an example of a CQI table according to this embodiment;

MODE(S) FOR CARRYING OUT THE INVENTION

Hereinafter, description will be given of an embodiment of the invention with reference to the accompanying drawings. Furthermore, the following embodiment is illustrative only, and an embodiment to which the invention is applied is not limited to the following embodiment. For example, in a radio communication system according to this embodiment, a system of a mode in conformity to LTE is assumed, the invention is applicable to other modes without limitation to the LTE. Furthermore, in this specification and claims, "LTE" is used in broad meaning including not only a communication mode corresponding to Release 8 or 9 of 3GPP but also a corresponding fifth generation communication mode subsequent to Release 10, 11, 12, 13, or 14 of the 3GPP unless otherwise stated.

In addition, in the following description, a channel quality indicator is described as "CQI", but in this embodiment, an indicator of a different name is also included as long as the indicator represents a modulation mode and a code rate which are recommended.

<With Respect to Channel Quality Indicator (CQI)>

Here, description will be given of the CQI that is defined in current LTE. A user equipment UE measures a radio channel state (for example, signal to interference plus noise ratio (SINR)) by using a resource that is included in a downlink signal from the base station eNB and is called a CSI reference resource, and calculates (determines) a CQI which is estimated to realize a communication with a block error rate of 10% or less on the basis of the measurement result. More specifically, the CSI measurement resource is a cell-specific reference signal (CRS) and a channel state information-reference signal (CSI-RS).

FIG. 1 is a view illustrating a CQI table that is defined in the LTE. In the CQI table, a value of a CQI index is associated with a modulation mode and a code rate. A user equipment UE selects any one CQI index from the CQI table on the basis of a measurement result of the radio channel state, and reports the selected CQI index to a base station eNB. The base station eNB compares the CQI index that is transmitted from the user equipment UE in notification and the CQI table with each other, and recognizes a modulation mode and a code rate which are recommended for a downlink shared channel communication. In LTE of Rel-13, three kinds of CQI tables are defined. FIG. 1(*a*) is a CQI table that is used in a downlink communication that uses any one of QPSK, 16QAM, and 64QAM, FIG. 1(*b*) is a CQI table that is used in a downlink communication that uses any one of QPSK, 16QAM, 64QAM, and 256QAM, and FIG. 1(*c*) is a CQI table for an enhanced machine type communication (eMTC) terminal. Furthermore, a CQI index "0" in the CQI table is an index value that is transmitted for notification in a case where the user equipment UE estimates that it is difficult to satisfy a block error rate of 10% or less.

<System Configuration>

Figure 2:
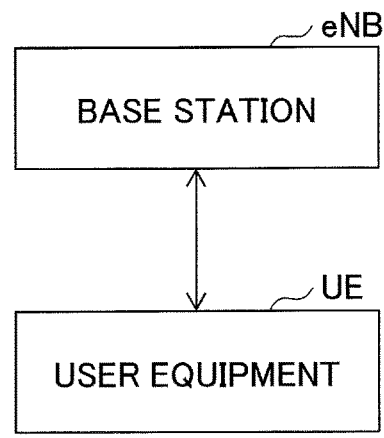
FIG. 2 is a view illustrating a configuration example of a radio communication system according to an embodiment.

FIG. 2 is a view illustrating a configuration example of a radio communication system according to this embodiment. As illustrated in FIG. 2, the radio communication system according to this embodiment includes the base station eNB and the user equipment UE. In an example illustrated in FIG. 2, the base station eNB and the user equipment UE are illustrated one by one, but a plurality of the base stations eNB may be provided, and a plurality of the user equipments UE may be provided.

As defined in the current LTE, the user equipment UE according to this embodiment has a function of calculating a CQI which is estimated to realize a communication with in which a block error rate of TB is 10% or less. In addition, the user equipment UE has a function of calculating a CQI which is estimated to realize a communication in which a block error rate of TB becomes equal to or less than a predetermined error rate (for example, 1% and the like) that is further lower than 10% so as to establish a communication with further higher reliability.

<Procedure>

Subsequently, description will be given of a procedure when the base station eNB acquires the CQI in which the block error rate is equal to or less than a predetermined error rate.

(Procedure (First Procedure Thereof))

Figure 3:
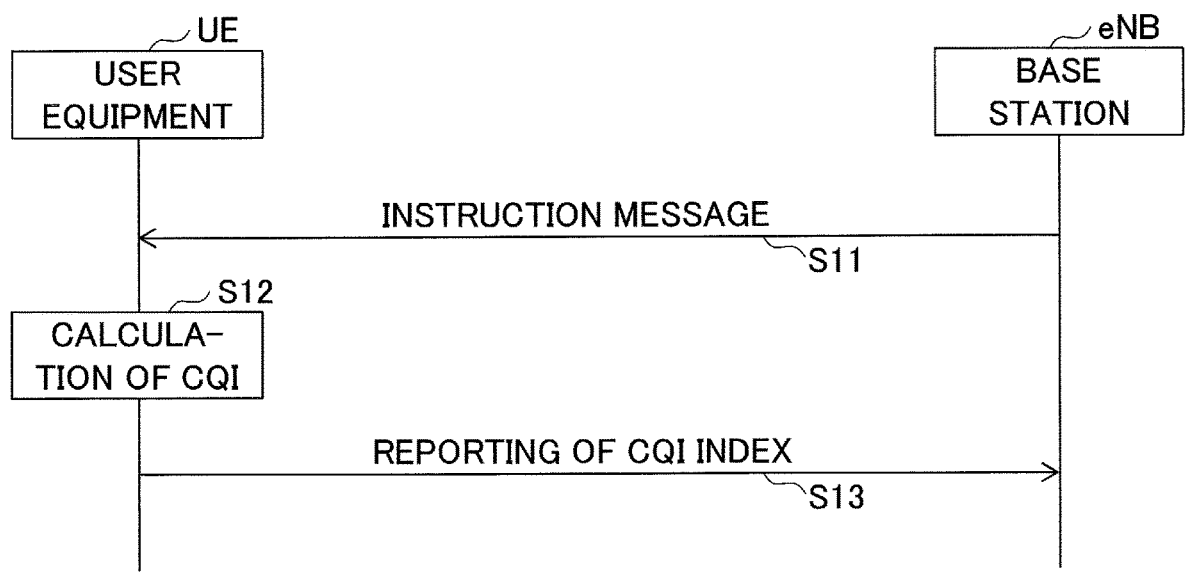
FIG. 3 is a sequence diagram illustrating a procedure (a first procedure thereof) when acquiring a CQI in which a block error rate is equal to or less than a predetermined error rate.

FIG. 3 is a sequence diagram illustrating a procedure (first procedure thereof) when acquiring the CQI in which the block error rate is equal to or less than a predetermined error rate. First, the base station eNB transmits a message (hereinafter, referred to as "instruction message"), which gives an instruction for a calculation method of a CQI (a reporting method of a CQI) to be reported to the base station eNB, to the user equipment UE (S11). The instruction message may include information (1-bit information, and the like) indicating that a CQI index in which the block error rate is equal to or less than a predetermined error rate (for example, 1%) is to be reported, or a CQI index that is calculated under the same conditions (block error rate is 10% or less) as in LTE of the related art is to be reported. In addition, in the instruction message, a value of the block error rate to be applied for calculation of the CQI by the user equipment UE may be specifically set, or an index value (for example, in a case of an index value of "1", the block error rate is 1%, and the like) corresponding to the block error rate to be applied for calculation of the CQI may be set. In addition, a range (for example, 2% to 3%, and the like) of the block error rate to be applied for calculation of the CQI by the user equipment UE may be set.

In addition, various offset values to be used when calculating the CQI may be set in the instruction message. For example, the various offset values may be an offset value (for example, an offset value to be added or subtracted to or from the CQI value) capable of converting a CQI, which is calculated under the same conditions (block error rate is 10% or less) as in LTE of the related art by the user equipment UE, into a CQI corresponding to a predetermined error rate or less. For example, in a case where the CQI value that is calculated is "5", and the offset value is "−2", the user equipment UE operates to report "3" as the CQI index to the base station eNB. In addition, the offset values may include an offset value for correcting a radio channel state that is measured when calculating the CQI in the user equipment UE (for example, an offset value for correcting interference power measured in the user equipment UE, and the like). The equipment UE calculates the CQI on the basis of the radio channel state that is corrected with the offset value to indirectly calculate the CQI that is equal to or less than a predetermined error rate.

The base station eNB may transmit the instruction message to the user equipment UE by using an RRC message, or may transmit the instruction to the user equipment UE by using a message of Layer 2 (MAC sublayer) or control information (downlink control information (DCI)) that is transmitted in a physical layer.

Furthermore, with regard to a calculation method of the CQI, when determining whether or not to calculate a CQI that is equal to or less than the block error rate in LTE of the related art or to calculate a CQI that is equal to or less than a predetermined error rate, the base station eNB may make a determination on the basis of a QoS class identifier (QCI) of a bearer that is established between the user equipment UE and the base station eNB, or may make a determination on the basis of quality of service (QoS) that is requested from the user equipment UE.

Subsequently, the user equipment UE calculates the CQI in response to an instruction in the instruction message (S12). The may calculate the CQI by an arbitrary method. However, for example, the user equipment UE calculates the CQI measures a radio channel state (for example, SINR) by using a CSI reference resource included in the downlink signal from the base station eNB, and calculates the CQI on the basis of the radio channel state that is measured.

Subsequently, the user equipment UE reports a CQI index corresponding to the CQI that is calculated to the base station eNB (S13). The base station eNB can recognize a modulation mode and a code rate which are recommended for a downlink shared channel communication by comparing the CQI index that is reported and the CQI table with each other.

In the above-described procedure (first procedure thereof), in a case where a value of a block error rate to be applied to calculation of the CQI is designated in the instruction message, it is possible to allow the user equipment UE to estimate a more accurate CQI. In addition, in a case where various offset values to be used when calculating the CQI are designated in the instruction message, it is possible to suppress the CQI calculation processing in the user equipment UE from being complicated.

(Procedure (Second Procedure Thereof))

Figure 4:
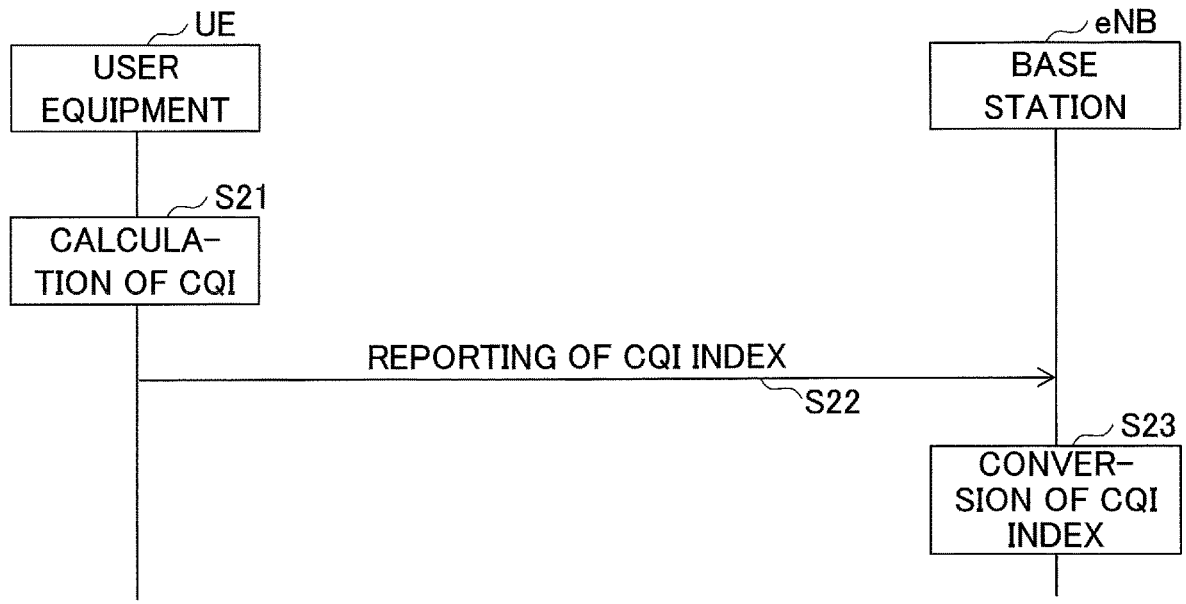
FIG. 4 is a sequence diagram illustrating a procedure (a second procedure thereof) when acquiring a CQI in which the block error rate is equal to or less than a predetermined error rate.

FIG. 4 is a sequence diagram illustrating the procedure (second procedure thereof)) when acquiring the CQI in which the block error rate is equal to or less than a predetermined error rate. First, the user equipment UE calculates a CQI in the same procedure as in LTE of the related art (S21). That is, the user equipment UE calculates the CQI which is estimated to realize a communication with a block error rate of 10% or less. Subsequently, the user equipment UE reports a CQI index corresponding to the CQI that is calculated to the base station eNB (S22). Subsequently, the base station eNB converts the CQI index that is given in notification into a CQI index corresponding to a desired block error rate that is desired by the base station eNB (S23). A conversion method may be an arbitrary method. However, for example, the CQI index may be converted by adding or subtracting an offset value that converts the CQI given in notification into a CQI corresponding to a predetermined error rate or less. Subsequently, the base station eNB recognizes a modulation method and a code rate which are recommended for a downlink shared channel communication by comparing the CQI index that is converted, and the CQI table with each other.

In the above-described procedure (second procedure thereof), it is possible to acquire the CQI in which the block error rate is equal to or less than a predetermined error rate without changing an operation on a user equipment UE side.

(Procedure (Third Procedure Thereof))

Figure 5:
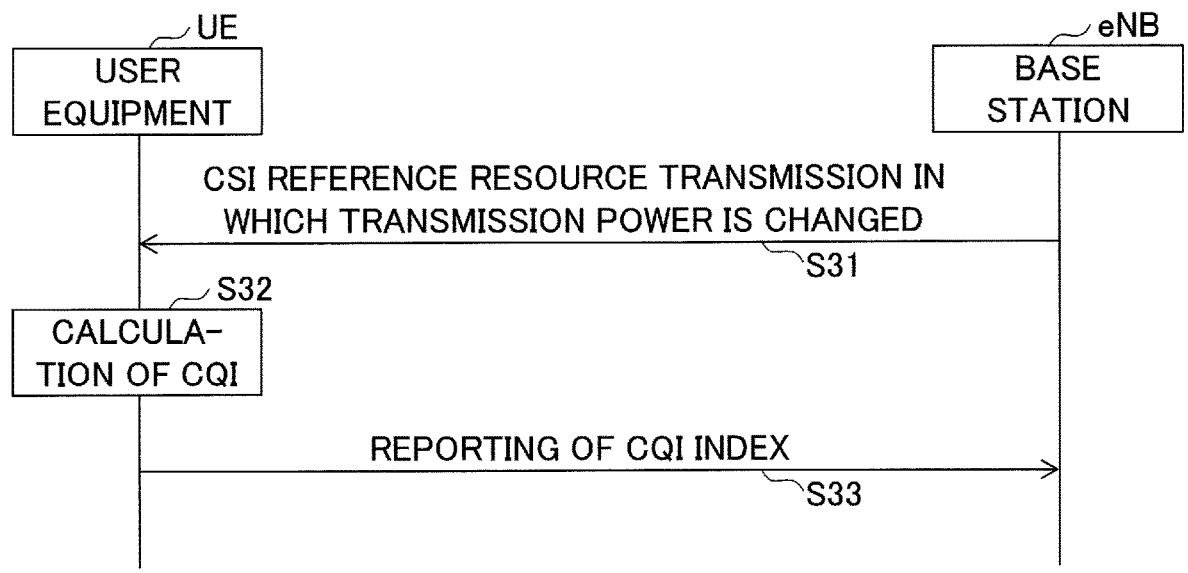
FIG. 5 is a sequence diagram illustrating a procedure (a third procedure thereof) when acquiring a CQI in which the block error rate is equal to or less than a predetermined error rate.

FIG. 5 is a sequence diagram illustrating the procedure (third procedure thereof) when acquiring the CQI in which the block error rate is equal to or less than a predetermined error rate. When transmitting a signal corresponding to the CSI reference resource to the user equipment UE, the base station eNB transmits the signal to the user equipment UE in a state of intentionally changing transmission power of the signal (S31). For example, the base station eNB transmits the CSI reference resource to the user equipment UE in a state of intentionally lowering transmission power of the CSI reference resource. Subsequently, the user equipment UE calculates the CQI in the same procedure as in LTE of the related art (S32). That is, the user equipment UE calculates a CQI that is estimated to realize a communication with a block error rate of 10% or less. Subsequently, the user equipment UE reports a CQI index corresponding to the CQI that is calculated to the base station eNB (S33).

Here, the base station eNB transmits the CSI reference resource to the user equipment UE in a state of intentionally changing transmission power, and the user equipment UE calculates the CSI by the same calculation method as in LTE of the related art. That is, the user equipment UE erroneously determines the radio channel state as being poor than an original state, and gives a notification of a CQI index that has a value lower than that of a CQI index to be originally given in notification.

In the above-described procedure (third procedure thereof), it is possible to acquire the CQI in which the block error rate is equal to or less than a predetermined error rate without changing an operation on a user equipment UE side.

(With Respect to CQI Table)

In the above-described procedure (first procedure thereof), separately form the CQI table of the related art as illustrated in FIG. 1, a CQI table corresponding to a predetermined block error rate may be defined in advance, and the user equipment UE may switch the CQI table, which is used in reporting of the CQI index, in response to an instruction of the instruction message (S11 in FIG. 3). For example, FIG. 6(*a*) illustrates an example of the CQI table that is used when reporting a CQI in which the block error rate is x % or less (for example, x is 1%, and the like) to the base station eNB. For example, FIG. 6(*b*) illustrates an example of the CQI table that is used when reporting a CQI in which the block error rate is 10% or less to the base station eNB. According to this, in the radio communication system, it is possible to switch definition of the CQI index in various manners in correspondence with the upper limit of the block error rate that is requested.

In addition, in the above-described procedure (first procedure thereof), when reporting the CQI index in which the block error rate is equal to or less than a predetermined error rate to the base station eNB, a definition may be made in advance so that the user equipment UE reports only a CQI index in a range that is limited in advance to the base station eNB. For example, as can be seen from the CQI table illustrated in FIG. 6(*c*), a CQI index corresponding to a block error rate of x % or less (for example, x is 1% and the like) is "0" to "6", and a CQI index corresponding to a block error rate of 10% or less is "0" to "15". That is, in a case of giving a notification of a CQI index in which the block error rate is x % or less in response to the instruction of the instruction message (S11 in FIG. 3), the user equipment UE operates to report any one CQI index among "0" to "6" to the base station eNB. According to this, in the radio communication system, it is possible to reduce a data size (the number of bits) when reporting the CQI index from the user equipment UE to the base station eNB.

In addition, as another example, the CQI table may be defined in such a manner that a CQI index corresponding to three or greater block error rates is included in one CQI table. For example, the CQI table may be defined in such a manner that CQI indexes "0" to "15" correspond to a CQI with respect to a block error rate of x %, CQI indexes "16" to "31" correspond to a CQI with respect to a block error rate of y %, and CQI indexes "32" to "47" correspond to a CQI with respect to a block error rate of z %. According to this, CQIs, which correspond to various block error rates, can be reported, and thus it is possible to set a CQI that is optimized for a service that is assumed. In addition, in the CQI table, the range of the CQI index corresponding to each block error rate is limited, and thus it is possible to reduce (or fix) the data size (the number of bits) when reporting the CQI index from the user equipment UE to the base station eNB. For example, in the above-described example, the CQI index with respect to each of the block error rates of x %, y %, and z % can be reported in a four-bit data size. In addition, among a plurality of the CQI indexes included in the CQI table, a range of the CQI index that is used for each block error rate may be set by notification information or a higher layer signaling (RRC signaling and the like) by the base station eNB to set a CQI table that is optimized for a network configuration such as the number of base station antennas and a cell radius (more specifically, to newly set a CQI table from which a part of the plurality of CQI indexes included in a parent CQI table is cut out).

(With Respect to Band that is Used in CQI Calculation)

In LTE of the related art, a wideband CQI that is calculated with respect to the entirety of a system band as a target, and a subband CQI that is calculated with respect to a subband as a target are defined as a CQI that is reported from the user equipment UE to the base station eNB. Here, in the above-described procedure (first procedure thereof) to (third procedure thereof), the user equipment UE may notify the base station eNB of both the wideband CQI and the subband CQI.

Figures 7, 8:
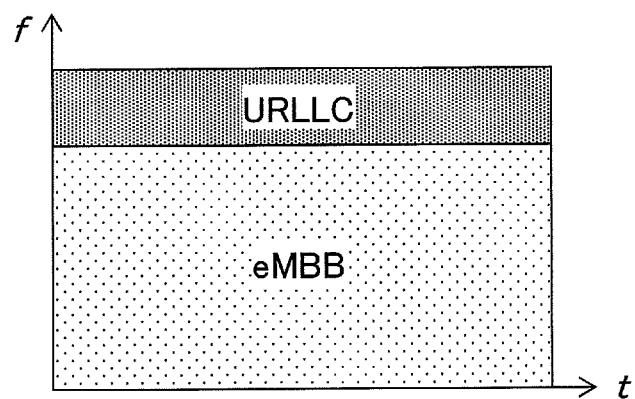
FIG. 7 is a view illustrating an example in which a band that is used in a communication is frequency-multiplexed.
FIG. 8 is a view illustrating an example of CSI report message.

Here, in 5G, as illustrated in FIG. 7, there is a possibility that a communication method, in which a band that is used in a communication according to the URLLC and a band that is used in a communication according to an enhanced mobile broad band (eMBB) are frequency-multiplied, is applied. Furthermore, the eMBB is a term indicating the entirety of next generation communication modes which are realized by 5G, and in FIG. 7 (the same shall apply hereinafter), the eMBB is used for convenience for discrimination from a communication according to the URLLC for which high reliability is required. As illustrated in FIG. 7, in a case where a band that is used in a communication is limited, when calculating the wideband CQI, the user equipment UE may calculate a CQI by using a CSI reference resource in a specific band. In addition, in a case where the specific band is further divided into a plurality of subbands, the user equipment UE may calculate each subband CQI by using a CSI reference resource in each of the subbands in the specific band. In addition, the specific band and a range of the plurality of subbands in the specific band may be given (set) in notification from the base station eNB to the user equipment UE, or may be set (preconfigured) in the user equipment UE in advance. According to this, in a case where a band that is used in a communication is limited, the CQI is calculated in the band, and thus a more suitable CQI can be calculated.

(With Respect to Coding Method)

In LTE of the related art, a fixed coding method (turbo coding) is employed in a downlink shaped channel. However, in the radio communication system according to this embodiment, a plurality of coding methods may be supported. Furthermore, it is assumed that when coding methods are different from each other, modulation modes and code rates, which are capable of achieving the same block error rate, are also different from each other. Accordingly, in the above-described procedure (first procedure thereof), in a case of using a coding method that is applied to the downlink shared channel, the user equipment UE may report a CQI index, which is estimated to realize a communication in which the block error rate is equal to or less than a predetermined value (10%, 1%, and the like), to the base station eNB.

Here, for example, the coding method, which is applied to the downlink shared channel, may be explicitly (implicitly) instructed (set) from the base station eNB to the base station eNB to the user equipment UE by notification information, an RRC message, downlink control information (DCI), and the like. In addition, information indicating the coding method applied to the downlink shared channel may be included in the instruction message (S11 in FIG. 3). The user equipment UE reports a CQI index in a case of using the coding method, which is explicitly (implicitly) instructed from the base station eNB, to the base station eNB.

In addition, the user equipment UE may arbitrarily select the coding method when calculating the CQI. In this case, the user equipment UE reports the coding method that is selected by the user equipment UE and the CQI index that is calculated, which are correlated with each other, to the base station eNB. FIG. 8 illustrates an example of a CSI report message including an index value (coding index) indicating the coding method that is selected by the user equipment UE, and the CQI index.

In addition, with respect to each of a plurality of coding methods which are supported in the radio communication systems, the user equipment UE may report the CQI index to the base station eNB. According to this, for example, in a case where an operation of performing scheduling is performed by selecting any one coding method among the plurality of coding methods in the downlink shared channel, the base station eNB can select a suitable coding method on the basis of the CQI that is reported.

Furthermore, a CQI table that is different for each coding method may be prepared in advance, and the user equipment may report the CQI index to the base station eNB by using a CQI table corresponding to a coding method that is applied to the downlink shared channel. FIG. 9(a) illustrates an example of a CQI table corresponding to a block error rate of x % or less and a coding method X, and a CQI table corresponding to a block error rate of x % or less and a coding method Y, and FIG. 9(b) illustrates an example of a CQI table corresponding to a block error rate of 10% or less (that is, the same as in LTE of the related art) and a coding method X, and a CQI table corresponding to a block error rate of 10% or less and a coding method Y. According to this, in the radio communication system, it is possible to switch the definition of the CQI index in various manners in accordance with a coding method.

(With Respect to CQI Reporting Method in Case where Plurality of Bearers are Established)

Figure 10:
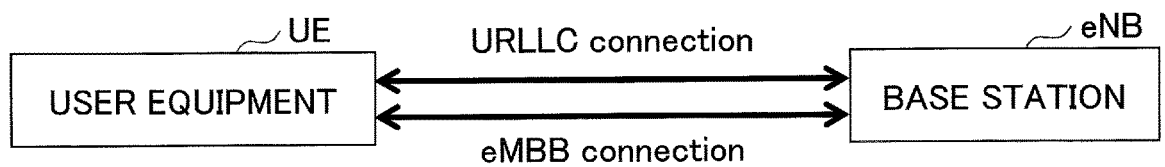
FIG. 10 is a view illustrating a case where a communication is performed by using a plurality of bearers.

In 5G, it is assumed that the user equipment UE and the base station eNB perform a communication by establishing a plurality of bearers which are different in a required condition for quality. For example, as illustrated in FIG. 10, it is assumed that the user equipment UE and the base station eNB perform a communication by establishing a bearer that is used in a communication according to the URLLC and a bearer that is used in a communication according to the eMBB. In this case, with respect to any one bearer among the plurality of bearers, the user equipment UE may report only a CQI index, which is estimated to realize a communication with a predetermined block error rate or less which is capable of corresponding to quality of the bearer, to the base station eNB. In addition, with respect to each of the plurality of bearers, the user equipment UE may report a CQI index, which is estimated to realize a communication with a predetermined block error rate or less which is capable of corresponding to quality of each of the plurality of bearers, to the base station eNB. In addition, in a case of reporting the CQI index to the base station eNB for each of the plurality of bearers, a method of calculating the CQI by the user equipment UE may be different between a case where a usage band is not frequency-multiplexed for each bearer, and a case where a usage band is frequency multiplexed (for example, a case similar to FIG. 7). A specific procedure will be described in the following columns of "[Reporting of Only Signal CQI]" and "[Reporting of CQI for Each Bearer]".

Furthermore, the base station eNB may notify the user equipment UE of the upper limit of a predetermined block error rate which is capable of corresponding to quality of each bearer. For example, the base station eNB may give a notification to the user equipment UE by using notification information, an RRC message, downlink control information (DCI), and the like. In addition, the notification may be included in the above-described instruction message (S11 in FIG. 3). In addition, the upper limit of the block error rate, which is required as quality (for example, QCI) of the bearer, may be defined in advance in standard specifications and the like, and the user equipment UE may determine a block error rate condition that is required on the basis of the quality of the bearer.

[Reporting of Only Single CQI (First Reporting Thereof)

The base station eNB explicitly instructs a bearer of which a CQI is to be reported by the user equipment UE, or a reporting method of the CQI (calculation method of the CQI) to the user equipment UE, and the user equipment UE reports the CQI index to the base station eNB on the basis of the upper limit of the block error rate which is requested for the bearer that is instructed, or on the basis of the calculation method of the CQI which is instructed. Furthermore, the instruction may be included in the above-described instruction message (S11 in FIG. 3).

[Reporting of Only Signal CQI (First Reporting Thereof]

Among a plurality of bearers which are established with the base station eNB, the user equipment UE reports a CQI index with respect to a bearer in which the upper limit of the block error rate which is required is the lowest to the base station eNB. According to this, the base station eNB can receive a report of a CQI, in which a required condition is the strictest, from the user equipment UE.

Furthermore, as described in the column of "(With Respect to Band That is Used in CQI Calculation)", in a case where a band that is used is different for each bearer, the user equipment UE may calculate the CQI in a band (or a subband) that is used in the bearer. In addition, the base station eNB may notify the user equipment UE of a bandwidth that is used in the bearer and/or a subframe in which the CQI is measured.

[Reporting of CQI for Each Bearer (Case where Use Band is not Frequency-Multiplexed for Each Bearer)]

The user equipment UE calculates the CQI by using a CSI reference resource (for example, a CSI reference resource of the entirety of a system band, or a CSI reference resource in a subband) that is common to bearers, and notifies the base station eNB of the CQI index for each bearer.

As a method of reporting the CQI index for each bearer, the user equipment UE may express any one CQI index as an offset value. For example, on the assumption that the CQI index of a bearer A is "5", and the CQI index of a bearer B is "11", the user equipment UE may notify the base station eNB of a configuration in which the CQI index of the bearer A is "5" and the offset value is "+6".

In addition, as a method of reporting the CQI index for each bearer, the user equipment UE may switch a bearer, of which the CQI index is reported, for each subframe in which the CQI index is reported. For example, on the assumption that the bearer A and the bearer B are established, a CQI index corresponding to the bearer A may be reported in an odd-numbered subframe, and a CQI index corresponding to the bearer B may be reported in an even-numbered subframe.

In addition, as a method of reporting the CQI index for each bearer, the user equipment UE may switch a bearer related to reporting by periodic CSI reporting and aperiodic CSI reporting. For example, in the periodic CSI reporting, the user equipment UE may report only a CQI index (for example, a CQI index with respect to a bearer in which the required upper limit of the block error rate is the lowest) corresponding to any one bearer to the base station eNB, and in the aperiodic CSI reporting, the user equipment UE may report the entirety of CQI indexes for every bearer to the base station eNB.

In addition, as a method of reporting the CQI index for each bearer, the user equipment UE may switch a bearer related to reporting of the CQI index on the basis of an instruction of the base station eNB. For example, when being instructed from the base station eNB to report a CQI index corresponding to the bearer A, the user equipment UE may report the CQI index corresponding to the bearer A, and when being instructed from the base station eNB to report a CQI index corresponding to the bearer B, the user equipment UE may report a CQI index corresponding to the bearer B to the base station eNB.

[Reporting of CQI for Each Bearer (Case where Use Band is Frequency-Multiplexed for Each Bearer)]

The user equipment UE calculates the CQI by using a CSI reference resource (for example, a CSI reference resource of a band according to the URLLC illustrated in FIG. 7, or a CSI reference resource of a band according to the eMBB) that is different in each bearer, and notifies the base station eNB of the CQI index for each bearer. According to this, in a case where a band that is used in a communication is different in each bearer, the CQI is calculated in the band, and thus it is possible to calculate a more suitable CQI.

<Functional Configuration>

Description will be given of a functional configuration example of the user equipment UE and the base station eNB which execute a plurality of the operations in the embodiment as described above.

(User Equipment)

Figure 11:
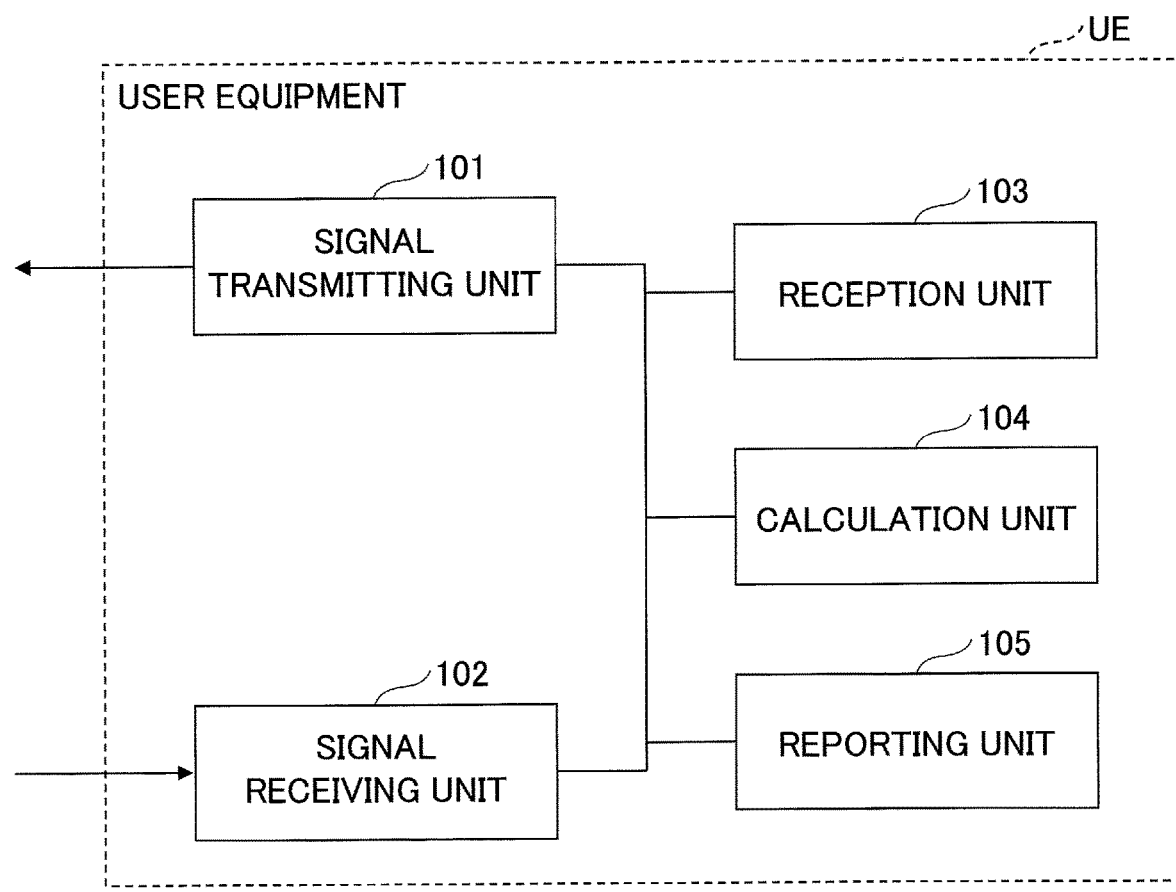
FIG. 11 is a view illustrating an example of a functional configuration of a user equipment according to this embodiment.

FIG. 11 is a view illustrating an example of a functional configuration of the user equipment according to the embodiment. As illustrated in FIG. 11, the user equipment UE includes a signal transmitting unit 101, a signal receiving unit 102, a reception unit 103, a calculation unit 104, and a reporting unit 105. Furthermore, FIG. 11 illustrates only functional units which particularly relate to the embodiment of the invention in the user equipment UE, and the user equipment UE also has at least a function (not illustrated) of performing an operation in conformity to LTE. In addition, the functional configuration illustrated in FIG. 11 is illustrative only. A functional classification or the name of the functional units may be arbitrarily set as long as the operation according to the embodiment can be executed. However, a part of the above-described processing in the user equipment UE (for example, one or a plurality of procedures, a modification example or a specific example only, and the like) may be set to be executed.

The signal transmitting unit 101 includes a function of generating various signals of a physical layer from a higher layer signal to be transmitted from the user equipment UE, and wirelessly transmitting the signals. The signal receiving unit 102 includes a function of wirelessly receiving the various signals from another user equipment UE or the base station eNB, and acquiring a signal of a further higher layer from a physical layer signal that is received. Furthermore, the signal transmitting unit 101 and the signal receiving unit 102 may communicate with the base station eNB by using a plurality of bearers which are different in a required condition for quality (for example, the QCI).

The reception unit 103 has a function of receiving an instruction related to a calculation method of a CQI, which is to be reported to the base station eNB, from the base station eNB. Furthermore, the reception unit 103 may receive an "instruction message" indicating the instruction as an RRC message, a message of Layer 2 (MAC sublayer), or control information (DCI) transmitted by a physical layer to receive the instruction related to the calculation method of the CQI. Furthermore, the instruction related to the calculation method of the CQI may be an instruction for calculating a CQI which is estimated to realize a communication with a predetermined block error rate or less, or an instruction for adding or subtracting a predetermined offset value to or from an index of a CQI (for example, a CQI that satisfies a block error rate of 10% or less defined in LTE in the related art) that is calculated in the user equipment UE.

The calculation unit 104 has a function of calculating a CQI which is estimated to realize a communication with a predetermined block error rate or less. In addition, the calculation unit 104 has a function of calculating a CQI that is estimated to realize a communication with a predetermined error rate or less on the basis of the instruction related to the calculation method of the CQI that is received in the reception unit 103 and is to be reported to the base station eNB. In addition, the calculation unit 104 may measure a radio channel state (for example, SINR) by using a CSI reference resource that is included in a downlink signal from the base station eNB, and may calculate the CQI on the basis of a measurement result. Furthermore, the calculation unit 104 may be included in the reporting unit 105. In addition, when calculating a wideband CQI, the calculation unit 104 may calculate the CQI by using a CSI reference resource in a specific band. In addition, in a case where the specific band is further divided into a plurality of subbands, the calculation unit 104 may calculate each subband CQI by using the CSI reference resource in each of the subbands in the specific band.

The reporting unit 105 has a function of reporting an index of the CQI, which is calculated by the calculation unit 104, to the base station eNB. In addition, the reporting unit 105 may select the index of the CQI, which is reported to the base station eNB, in accordance with a CQI table that is defined in correspondence with a predetermined block error rate that is shown in the "instruction related to the calculation method of the CQI" given from the base station eNB.

In addition, the reporting unit 105 may report an index of the CQI, which is estimated to realize a communication with a predetermined block error rate or less as indicated by the "instruction related to the calculation method of the CQI" given from the base station eNB, to the base station eNB in a case of using a coding method instructed from the base station eNB or a coding method that is used in a communication with the base station eNB.

In addition, with respect to at least any one bearer among a plurality of the bearers which are different in a required condition for quality (for example, the QCI), the reporting unit 105 has a function of reporting an index of the CQI, which is estimated to realize a communication with a predetermined block error rate or less which is capable of corresponding to quality of the bearer, to the base station eNB.

In addition, with respect to each of the plurality of bearers which are different in a required condition for quality (for example, the QCI), in a case of reporting an index of the CQI, which is estimated to realize a communication with a predetermined block error rate or less which is capable of corresponding to the quality of each of the plurality of bearers, to the base station eNB, the reporting unit 105 may switch a bearer related to reporting of the index of the CQI for each subframe in which the index of the CQI is reported.

(Base Station)

Figure 12:
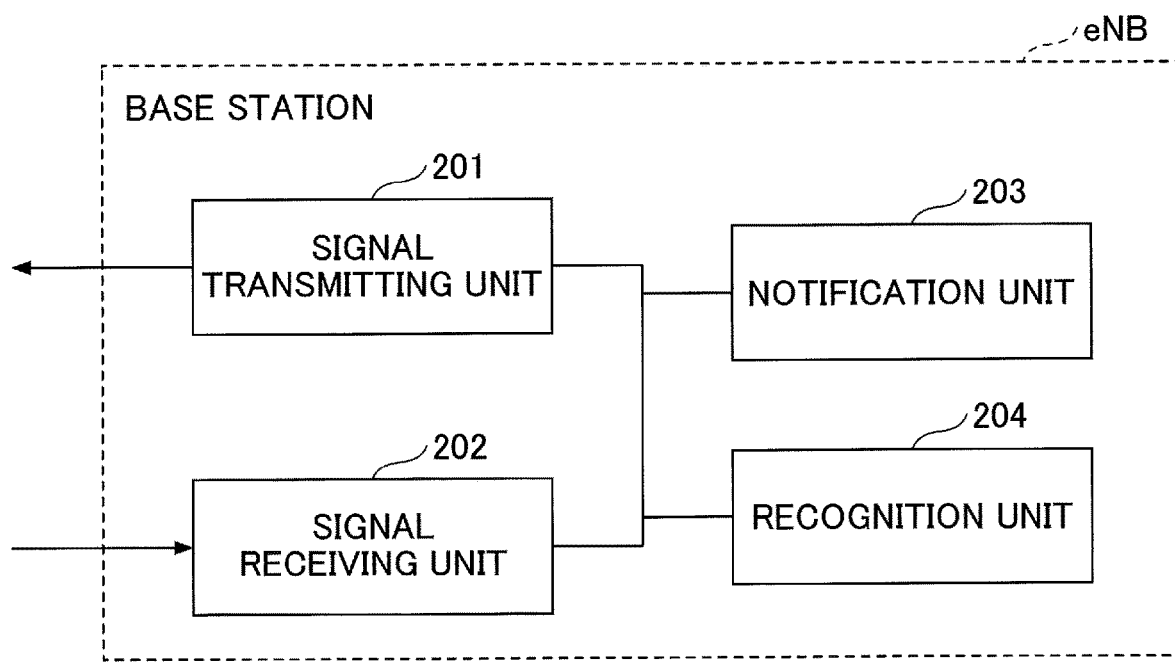
FIG. 12 is a view illustrating an example of a functional configuration of a base station according to this embodiment.

FIG. 12 is a view illustrating an example of a functional configuration of the base station according to the embodiment. As illustrated in FIG. 12, the base station eNB includes a signal transmitting unit 201, a signal receiving unit 202, a notification unit 203, and a recognition unit 204. Furthermore, FIG. 12 illustrates only functional units which particularly relate to the embodiment of the invention in the base station eNB, and the base station eNB also has at least a function (not illustrated) of performing an operation in conformity to LTE. In addition, the functional configuration illustrated in FIG. 12 is illustrative only. A functional classification or the name of the functional units may be arbitrarily set as long as the operation according to the embodiment can be executed. However, a part of the above-described processing in the base station eNB (for example, one or a plurality of procedures, a modification example or a specific example only, and the like) may be set to be executed.

The signal transmitting unit 201 includes a function of generating various signals of a physical layer from a higher layer signal to be transmitted from the base station eNB, and wirelessly transmitting the signals. In addition, the signal transmitting unit 201 includes a function of transmitting a CSI reference resource. In addition, when transmitting the CSI reference resource, the signal transmitting unit 201 may perform the transmission by changing transmission power of the CSI reference resource. For example, the transmission power to be changed may be transmission power that is lower than transmission power that is defined in standard specifications.

The signal receiving unit 202 includes a function of wirelessly receiving various signals from the user equipment UE, and acquiring a signal of a further higher layer from a physical layer signal that is received. In addition, the signal transmitting unit 201 and the signal receiving unit 202 may communicate with the user equipment UE by using a plurality of bearers which are different in a required condition for quality (for example, the QCI).

The notification unit 203 has a function of giving various instructions (notifications) related to the calculation method of the CQI, which is to be reported to the base station eNB, to the user equipment UE. Furthermore, the notification unit 203 may transmit the "instruction message" indicating the instruction through the signal transmitting unit 201 in a state of being included in the RRC message, the message of Layer 2 (MAC sublayer), or the control information (DCI) transmitted by a physical layer to the user equipment UE. In addition, the notification unit 203 may notify the user equipment UE of a specific band to be used in calculation of the CQI and a range of a plurality of subbands in the specific band. In addition, when communicating with the user equipment UE by using the plurality of bearers which are different in a required condition for quality, the notification unit 203 may notify the user equipment UE of a block error rate that is required for each bearer.

The recognition unit 204 has a function of recognizing a modulation mode and a code rate which are recommended for a downlink shared channel communication by comparing the CQI index that is reported from the user equipment UE, and the CQI table with each other. In addition, the recognition unit 204 may switch the CQI index, which is reported from the user equipment UE, into a CQI index corresponding to a block error rate that is desired by the base station eNB. For example, the recognition unit 204 may switch the CQI index by adding or subtracting an offset value to or from the CQI index that is reported.

The entirety of above-described functional configurations of the base station eNB and the user equipment UE may be realized by a hardware circuit (for example, one or a plurality of IC chips). In addition, a part of the functional configurations may be constituted by a hardware circuit and the other functional configurations may be realized by a CPU and a program.

(User Equipment)

Figure 13:
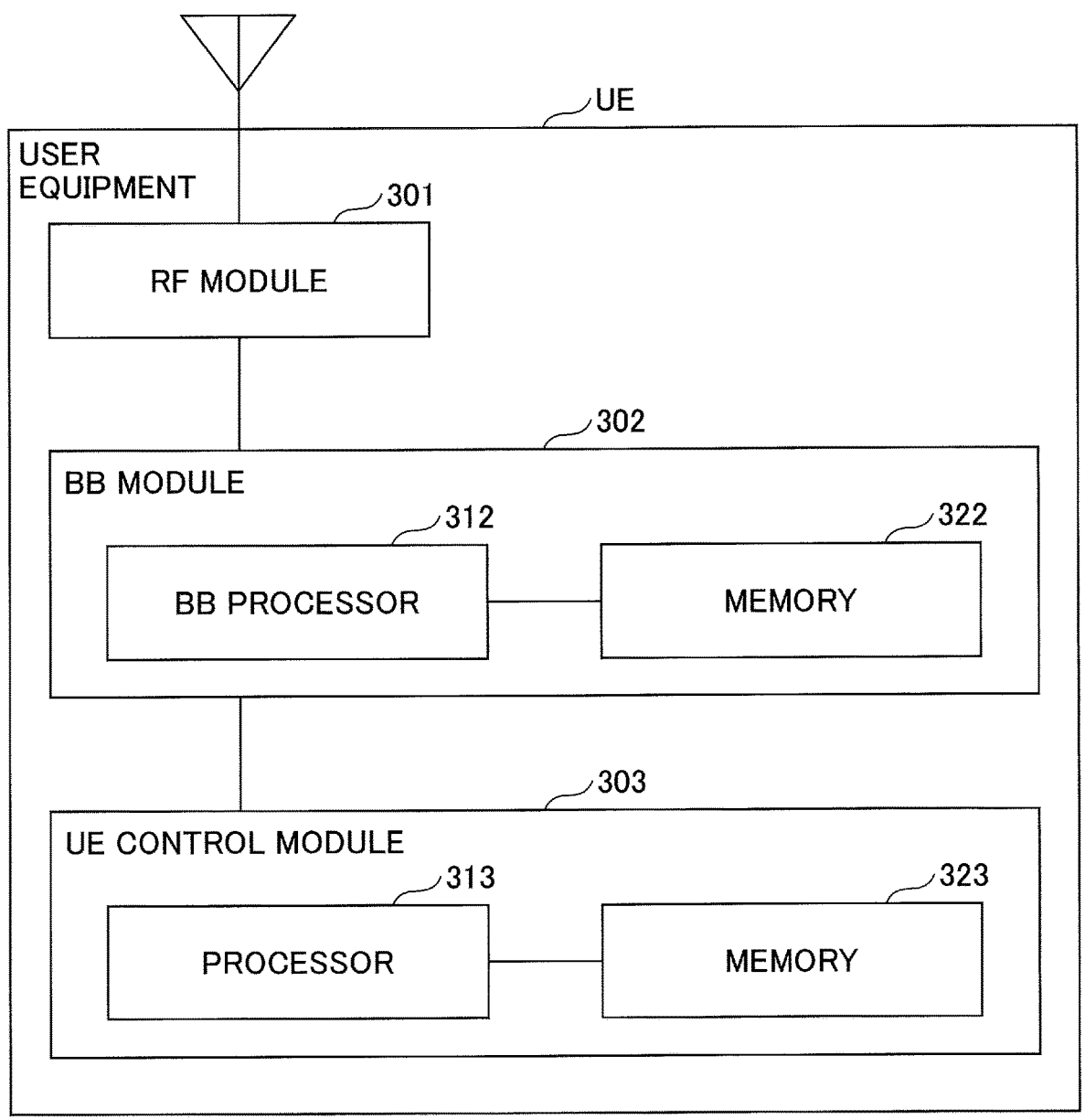
FIG. 13 is a view illustrating an example of a hardware configuration of the user equipment according to this embodiment.

FIG. 13 is a view illustrating an example of a hardware configuration of the user equipment according to the embodiment. FIG. 13 illustrates a configuration that is closer to a mounting example in comparison to FIG. 11. As illustrated in FIG. 13, the user equipment UE includes a radio frequency (RF) module 301 that performs processing related to a radio signal, a baseband (BB) processing module 302 that performs baseband signal processing, and a UE control module 303 that performs processing of a higher layer and the like.

With respect to a digital baseband signal that is received from the BB processing module 302, the RF module 301 performs digital-to-analog (D/A) conversion, modulation, frequency conversion, power amplification, and the like to generate a radio signal to be transmitted from an antenna. In addition, with respect to the radio signal that is received, the RF module 301 performs frequency conversion, analog-to-digital (A/D) conversion, demodulation, and the like to generate a digital baseband signal, and transmits the digital baseband signal to the BB processing module 302. For example, the RF module 301 includes parts of the signal transmitting unit 101 and the signal receiving unit 102 in FIG. 11.

The BB processing module 302 performs processing of converting an IP packet and a digital baseband signal from each other. A digital signal processor (DSP) 312 is a processor that performs signal processing in the BB processing module 302. A memory 322 is used as a work area of the DSP 312. For example, the RF module 301 includes a part of the signal transmitting unit 101, a part of the signal receiving unit 102, the reception unit 103, the calculation unit 104, and the reporting unit 105 in FIG. 11.

The UE control module 303 performs protocol processing of an IP layer, processing of various applications, and the like. A processor 313 is a processor that performs processing that is performed by the UE control module 303. A memory 323 is used as a work area of the processor 313. For example, the UE control module 303 may include the reception unit 103, the calculation unit 104, and the reporting unit 105 in FIG. 11.

(Base Station)

Figure 14:
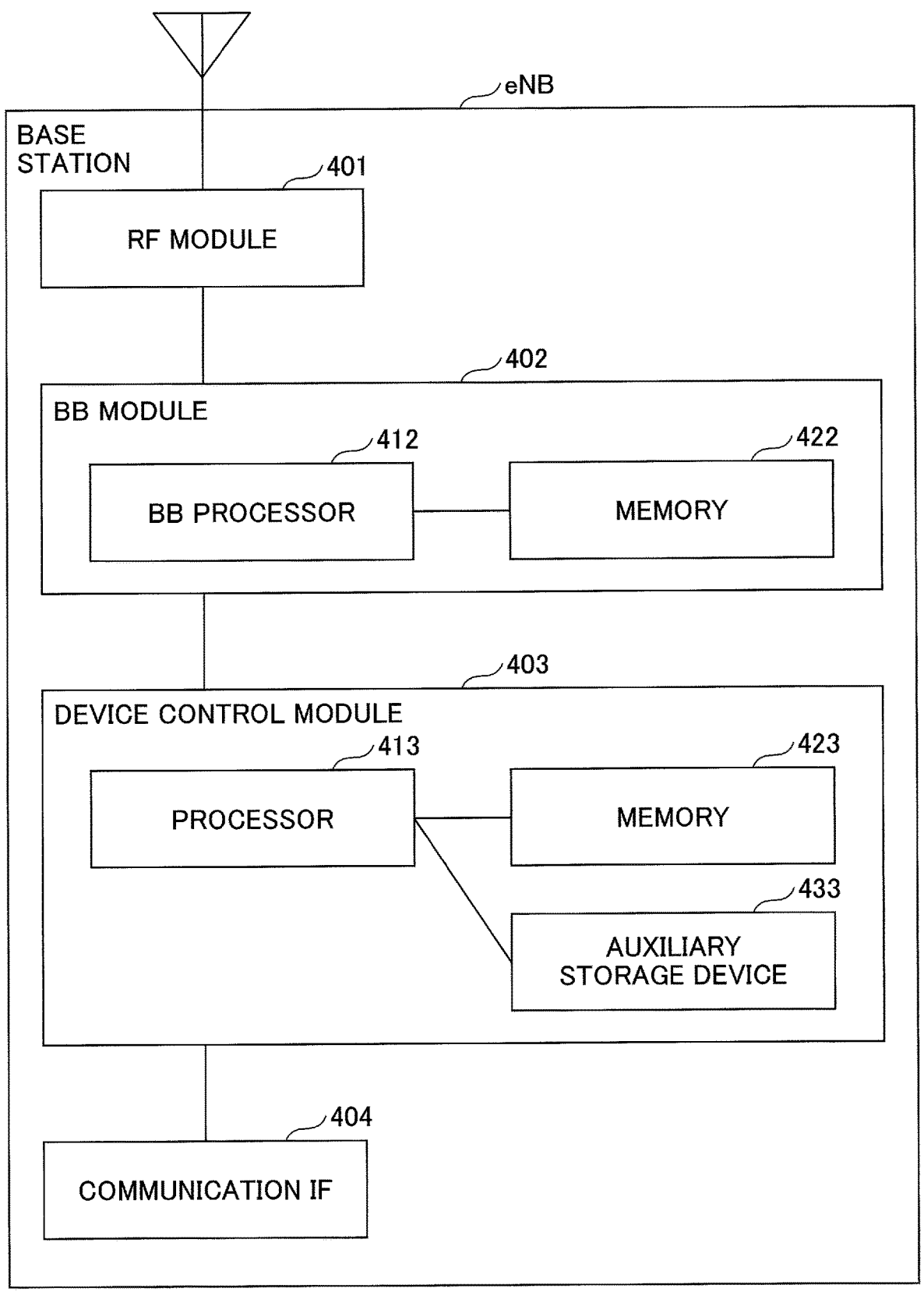
FIG. 14 is a view illustrating an example of a hardware configuration of the base station according to this embodiment.

FIG. 14 is a view illustrating an example of a hardware configuration of the base station according to the embodiment. FIG. 14 illustrates a configuration that is closer to a mounting example in comparison to FIG. 12. As illustrated in FIG. 14, the base station eNB includes an RF module 401 that performs processing related to a radio signal, a BB processing module 402 that performs baseband signal processing, a device control module 403 that performs processing of a higher layer and the like, and a communication IF 404 that is an interface for connection with a network.

With respect to a digital baseband signal that is received from the BB processing module 402, the RF module 401 performs D/A conversion, modulation, frequency conversion, power amplification, and the like to generate a radio signal to be transmitted from an antenna. In addition, with respect to the radio signal that is received, the RF module 401 performs frequency conversion, A/D conversion, demodulation, and the like to generate a digital baseband signal, and transmits the digital baseband signal to the BB processing module 402. For example, the RF module 401 includes parts of the signal transmitting unit 201 and the signal receiving unit 202 in FIG. 12.

BB processing module 402 performs processing of converting an IP packet and a digital baseband signal from each other. A DSP 412 is a processor that performs signal processing in the BB processing module 402. A memory 422 is used as a work area of the DSP 412. For example, the BB processing module 402 includes a part of the signal transmitting unit 201, a part of the signal receiving unit 202, the notification unit 203, and the recognition unit 204 in FIG. 12.

The device control module 403 performs protocol processing of an IP layer, operation and maintenance (OAM) processing, and the like. The processor 413 is a processor that performs processing that is performed by the device control module 403. A memory 423 is used as a work area of the processor 413. An auxiliary storage device 433 is, for example, an HDD and the like, and stores various kinds of setting information for an operation of the base station eNB, and the like. For example, the device control module 403 may include the notification unit 203 and the recognition unit 204 which are illustrated in FIG. 12.

<Summary>

According to the embodiment as described above, there is provided a user equipment in a radio communication system including a base station and the user equipment. The user equipment includes: a reception unit that receives an instruction related to a calculation method of a channel quality indicator, which is to be reported to the base station, from the base station; and a reporting unit that reports an index of a channel quality indicator, which is calculated in accordance with the instruction related to the calculation method of the channel quality indicator, to the base station. As described above, there is provided a technology capable of reporting a channel quality indicator, which realizes a further lower block error rate, to the base station.

Furthermore, the instruction related to the calculation method of the channel quality indicator may be an instruction for calculating a channel quality indicator which is estimated to realize a communication with a predetermined block error rate or less, or an instruction for adding or subtracting a predetermined offset value to or from an index of a channel quality indicator that is calculated by the user equipment. According to this, the user equipment UE can perform calculation of the CQI with various methods.

In addition, the reporting unit may select an index of the channel quality indicator to be reported to the base station in accordance with a channel quality indicator table which is defined in correspondence with a predetermined block error rate that is indicated by the instruction related to the calculation method of the channel quality indicator and in which a modulation mode and a code rate are associated with the index of the channel quality indicator. According to this, in this radio communication system, it is possible to switch definition of the CQI index in correspondence with the upper limit of the block error rate that is required in various manners.

In addition, the reporting unit may report an index of the channel quality identifier, which is estimated to realize a communication with a predetermined block error rate or less as indicated by the instruction related to the calculation method of the channel quality indicator, to the base station in a case of using a coding method instructed from the base station or a coding method that is used in a communication with the base station. According to this, the user equipment UE can report a CQI index corresponding to a coding method to the base station eNB.

In addition, according to the embodiment, there is provided a user equipment in a radio communication system including a base station and the user equipment. The user equipment includes: a communication unit that performs a communication with the base station by using a plurality of bearers which are different in a required condition for quality; and a reporting unit that reports an index of a channel quality indicator, which is estimated to realize a communication with a predetermined block error rate or less which is capable of corresponding to quality of at least any one bearer among the plurality of bearers, to the base station with respect to the bearer. As described above, there is provided a technology capable of reporting the channel quality indicator, which realizes a further lower block error rate, to the base station.

In addition, in a case of reporting an index of a channel quality identifier, which is estimated to realize a communication with a predetermined block error rate or less which is capable of corresponding to quality of each of the plurality of bearers, to the base station with respect to each of the plurality of bearers, the reporting unit may switch a bearer, of which the index of the channel quality identifier is reported, for each sub-frame in which the index of the channel quality indicator is reported. According to this, the user equipment UE can further suppress an increase in a radio resource in comparison to a case of simultaneously reporting CQIs with respect to the plurality of bearers to the base station eNB.

In addition, according to the embodiment, there is provided a reporting method that is executed by a user equipment in a radio communication system including a base station and the user equipment. The reporting method includes: a step of receiving an instruction related to a calculation method of a channel quality indicator, which is to be reported to the base station, from the base station; and a step of reporting an index of a channel quality indicator, which is calculated in accordance with the instruction related to the calculation method of the channel quality indicator, to the base station. According to the reporting method, there is provided a technology capable of reporting a channel quality indicator, which realizes a further lower block error rate, to the base station.

In addition, according to the embodiment, there is provided a reporting method that is executed by a user equipment in a radio communication system including a base station and the user equipment. The reporting method includes: a step of performing a communication with the base station by using a plurality of bearers which are different in a required condition for quality; and a step of reporting an index of a channel quality indicator, which is estimated to realize a communication with a predetermined block error rate or less which is capable of corresponding to quality of at least any one bearer among the plurality of bearers, to the base station with respect to the bearer. According to the reporting method, there is provided a technology capable of reporting a channel quality indicator, which realizes a further lower block error rate, to the base station.

<Complement of Embodiment>

The values described in the CQI tables in FIG. 6 and FIG. 9 are illustrative only, and there is no limitation thereto.

The configuration of the respective devices (the user equipment UE and the base station eNB) described in the embodiment of the invention may be a configuration that is realized when a program is executed by a CPU (processor) in a device including the CPU and a memory, or a configuration that is realized by hardware such as a hardware circuit including a logic of the processing described in this embodiment. In addition, the program or the hardware may be mixed in.

Hereinbefore, description has been given of the embodiment of the invention. However, the invention is not limited to the embodiment, and it should be understood by those skilled in the art that various modification examples, variation examples, alternative examples, substitution examples, and the like can be made. Description has been made by using a specific numerical example for comprehension of the invention, but numerical values are illustrative only, and arbitrary appropriate values may be used unless otherwise stated. The classification of the items in the above description is not essential in the invention, and details described in two or more items may be used in combination as necessary. In addition, details described in any item may be applied to details described in a different item (as long as inconsistency does not occur). It cannot be said that the boundary of the function units in the functional block diagram or the processing units correspond to a boundary of physical components. Operations of a plurality of function units may be performed physically with one component, or an operation of one function unit may be performed physically with a plurality of components. In the sequences and the flowcharts described in the embodiment, the order thereof may be changed as long as inconsistency does not occur. The user equipment UE and the base station eNB have been described by using functional block diagrams for convenience of processing explanation, but the devices may be realized by hardware, software, or a combination thereof. Software that operates by the processor provided to the user equipment UE in accordance with the embodiment of the invention, and software that operates by the processor provided to the base station eNB in accordance with the embodiment of the invention may be respectively stored in a random access memory (RAM), a flash memory, a read only memory (ROM), an EPROM, an EEPROM, a register, a hard disk drive (HDD), a removable disk, a CD-ROM, a database, a server, or other appropriate storage media.

Furthermore, the signal transmitting unit 101 and the signal receiving unit 102 are examples of the communication unit.

Information transmission (notification, reporting) may be performed not only by methods described in an aspect/embodiment of the present specification but also a method other than those described in an aspect/embodiment of the present specification. For example, the information transmission may be performed by physical layer signaling (e.g., DCI (Downlink Control Information), UCI (Uplink Control Information)), upper layer signaling (e.g., RRC signaling, MAC signaling, broadcast information (MIB (Master Information Block), SIB (System Information Block))), other signals, or combinations thereof. Further, an RRC message may be referred to as RRC signaling. Further, an RRC message may be, for example, an RRC connection setup message, an RRC connection reconfiguration message, or the like.

An aspect/embodiment described in the present specification may be applied to a system that uses LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), other appropriate systems, and/or a next generation system enhanced based thereon.

Determination or judgment may be performed according to a value (0 or 1) represented by a bit, may be performed according to a boolean value (true or false), or may be performed according to comparison of numerical values (e.g., comparison with a predetermined value).

It should be noted that the terms described in the present specification and/or terms necessary for understanding the present specification may be replaced by terms that have the same or similar meaning. For example, a channel and/or a symbol may be a signal. Further, a signal may be a message.

There is a case in which a UE may be referred to as a subscriber station, a mobile unit, subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

An aspect/embodiment described in the present specification may be used independently, may be used in combination, or may be used by switching according to operations. Further, transmission of predetermined information (e.g., transmission of "it is X") is not limited to explicitly-performed transmission. The transmission of predetermined information may be performed implicitly (e.g., explicit transmission of predetermined information is not performed).

As used herein, the term "determining" may encompasses a wide variety of actions. For example, "determining" may be regarded as calculating, computing, processing, deriving, investigating, looking up (e.g., looking up in a table, a database or another data structure), ascertaining and the like. Also, "determining" may be regarded as receiving (e.g., receiving information), transmitting (e.g., transmitting information), inputting, outputting, accessing (e.g., accessing data in a memory) and the like. Also, "determining" may be regarded as resolving, selecting, choosing, establishing, comparing and the like. That is, "determining" may be regarded as a certain type of action related to determining.

As used herein, the phrase "based on" does not mean, unless otherwise noted, "based on only". In other words, the phrase "base on" means both "based on only" and "based on at least".

Also, the order of processing steps, sequences or the like of an aspect/embodiment described in the present specification may be changed as long as there is no contradiction. For example, in a method described in the present specification, elements of various steps are presented in an exemplary order. The order is not limited to the presented specific order.

Input/output information, etc., may be stored in a specific place (e.g., memory) or may be stored in a management table. The input/output information, etc., may be overwritten, updated, or added. Output information, etc., may be deleted. Input information, etc., may be transmitted to another apparatus.

Transmission of predetermined information (e.g., transmission of "it is X") is not limited to explicitly-performed transmission. The transmission of predetermined information may be performed implicitly (e.g., explicit transmission of predetermined information is not performed).

Information, a signal, etc., described in the present specification may be represented by using any one of the various different techniques. For example, data, an instruction, a command, information, a signal, a bit, a symbol, a chip or the like described throughout in the present specification may be represented by voltage, current, electromagnetic waves, magnetic fields or a magnetic particle, optical fields or a photon, or any combination thereof.

The present invention is not limited to the above embodiments and various variations, modifications, alternatives, replacements, etc., may be included in the present invention without departing from the spirit of the invention.

The present application is based on and claims the benefit of priority of Japanese Priority Application No. 2016-073462 filed on Mar. 31, 2016, the entire contents of which are hereby incorporated by reference.

EXPLANATIONS OF LETTERS OR NUMERALS

UE: User equipment
eNB: base station
101: Signal transmitting unit
102: Signal receiving unit
103: Reception unit
104: Calculation unit
105: Reporting unit
201: Signal transmitting unit
202: Signal receiving unit
203: Notification unit
204: Recognition unit
301: RF module
302: BB processing module
303: UE control module
304: Communication IF
401: RF module
402: BB processing module
403: Device control module

The invention claimed is:
1. A terminal comprising:
a receiver that receives an instruction message related to calculation of a channel quality indicator; and
a transmitter that selects an index of the channel quality indicator in accordance with one of a plurality of channel quality indicator sets,
wherein the transmitter reports the index of the channel quality indicator, which is calculated in accordance with the instruction message related to the calculation of the channel quality indicator, to a base station, wherein each of the channel quality indicator sets is defined in correspondence with a block error rate that is indicated by the instruction message, and wherein each of the channel quality indicator sets indicates correspondence between:
the index of the channel quality indicator; and
a modulation method and a coding rate.

2. The terminal according to claim 1, wherein the instruction message related to the calculation of the channel quality indicator includes an instruction for calculating a channel quality indicator which is estimated to realize a communication with a block error rate or less.

3. The terminal according to claim 2, wherein the transmitter reports an index of the channel quality indicator, which is estimated to realize a communication with a block error rate or less as indicated by the instruction message related to the calculation of the channel quality indicator, to the base station in a case of using a coding method instructed from the base station.

4. The terminal according to claim 1, wherein the transmitter reports an index of the channel quality indicator, which is estimated to realize a communication with a block error rate or less as indicated by the instruction message related to the calculation of the channel quality indicator, to the base station in a case of using a coding method instructed from the base station.

5. A terminal comprising:
a processor that controls a communication with a base station by using a plurality of bearers which are different in a required condition for quality; and
a transmitter that reports an index of a channel quality indicator, which is estimated to realize a communication with a block error rate or less which is capable of corresponding to quality of at least any one bearer among the plurality of bearers, to the base station with respect to the bearer,
wherein in a case of reporting an index of a channel quality indicator, which is estimated to realize a communication with a block error rate or less which is capable of corresponding to quality of each of the plurality of bearers, to the base station with respect to each of the plurality of bearers, the transmitter switches a bearer, of which the index of the channel quality indicator is reported, for each sub-frame in which the index of the channel quality indicator is reported.

6. A communication method of a terminal comprising:
receiving an instruction message related to calculation of a channel quality indicator;
selecting an index of the channel quality indicator in accordance with one of a plurality of channel quality indicator sets; and
reporting the index of the channel quality indicator, which is calculated in accordance with the instruction message related to the calculation of the channel quality indicator, to a base station;

wherein each of the channel quality indicator sets is defined in correspondence with a block error rate that is indicated by the instruction message, and wherein each of the channel quality indicator sets indicates correspondence between:
the index of the channel quality indicator; and
a modulation method and a coding rate.

7. A communication method of a terminal comprising:
controlling a communication with a base station by using a plurality of bearers which are different in a required condition for quality; and
reporting an index of a channel quality indicator, which is estimated to realize a communication with a block error rate or less which is capable of corresponding to quality of at least any one bearer among the plurality of bearers, to the base station with respect to the bearer,
wherein in a case of reporting an index of a channel quality indicator, which is estimated to realize a communication with a block error rate or less which is capable of corresponding to quality of each of the plurality of bearers, to the base station with respect to each of the plurality of bearers, switching a bearer, of which the index of the channel quality indicator is reported, for each sub-frame in which the index of the channel quality indicator is reported.

8. A wireless communication system comprising: a terminal; and a base station, wherein
the terminal includes:
a first receiver that receives an instruction message related to calculation of a channel quality indicator; and
a first transmitter that selects an index of the channel quality indicator in accordance with one of a plurality of channel quality indicator sets,
wherein the first transmitter reports the index of the channel quality indicator, which is calculated in accordance with the instruction message related to the calculation of the channel quality indicator, to the base station,
wherein each of the channel quality indicator sets is defined in correspondence with a block error rate that is indicated by the instruction message, and
wherein each of the channel quality indicator sets indicates correspondence between:
the index of the channel quality indicator; and
a modulation method and a coding rate, and
the base station includes:
a second transmitter that transmits the instruction message related to calculation of a channel quality indicator; and
a second receiver that receives the index of the channel quality indicator, which is calculated in accordance with the instruction message related to the calculation of the channel quality indicator, from the terminal.

* * * * *